United States Patent
Pan et al.

(10) Patent No.: US 9,504,028 B2
(45) Date of Patent: Nov. 22, 2016

(54) BLIND DETECTION MODE DETERMINATION METHOD, BLIND DETECTION METHOD AND DEVICE

(71) Applicant: China Academy of Telecommunications Technology, Beijing (CN)

(72) Inventors: Xueming Pan, Beijing (CN); Rui Zhao, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/413,671

(22) PCT Filed: Jul. 4, 2013

(86) PCT No.: PCT/CN2013/078805
§ 371 (c)(1),
(2) Date: Jan. 8, 2015

(87) PCT Pub. No.: WO2014/008830
PCT Pub. Date: Jan. 16, 2014

(65) Prior Publication Data
US 2015/0189628 A1    Jul. 2, 2015

(30) Foreign Application Priority Data
Jul. 12, 2012 (CN) .......................... 2012 1 0242378

(51) Int. Cl.
*H04W 72/04* (2009.01)
*H04L 1/00* (2006.01)
(Continued)

(52) U.S. Cl.
CPC .............. *H04W 72/042* (2013.01); *H04L 1/00* (2013.01); *H04L 1/0046* (2013.01); *H04L 5/0053* (2013.01); *H04W 48/12* (2013.01); *H04L 1/0038* (2013.01); *H04W 72/0446* (2013.01)

(58) Field of Classification Search
None
See application file for complete search history.

(56) References Cited

U.S. PATENT DOCUMENTS

2011/0038275 A1    2/2011  Kim et al.
2013/0100901 A1*   4/2013  Shan ..................... H04L 5/0048
                                                        370/329
(Continued)

FOREIGN PATENT DOCUMENTS

CN    101557254          10/2009
CN    102014494 A         4/2011
(Continued)

OTHER PUBLICATIONS

International Search Report for PCT/CN2013/078805 mailed Oct. 17, 2013.
(Continued)

*Primary Examiner* — Duc Duong
(74) *Attorney, Agent, or Firm* — Foley & Lardner LLP; James F. Ewing; Paul M. H. Pua

(57) ABSTRACT

Disclosed are a blind detection mode determination method, blind detection method and device, the blind detection mode determination method comprising: a base station determines the E-PDCCH blind detection mode of a terminal in a subframe according to system configuration information and the blind detection capability of the terminal, and informs the terminal of the determined E-PDCCH blind detection mode of the terminal in the subframe. The blind detection method comprises: a terminal determines the E-PDCCH blind detection mode in a subframe, and conducts E-PDCCH blind detection in the subframe according to the determined E-PDCCH blind detection mode. The E-PDCCH blind detection mode of a UE in a subframe is determined according to the resource occupied in a subframe by the system configuration information, enabling the UE to conduct E-PDCCH blind detection in the subframe according to the determined E-PDCCH blind detection mode, thus avoiding unnecessary energy overhead.

14 Claims, 6 Drawing Sheets

(51) Int. Cl.
*H04W 48/12* (2009.01)
*H04L 5/00* (2006.01)

(56) References Cited

U.S. PATENT DOCUMENTS

| | | | | |
|---|---|---|---|---|
| 2013/0107822 | A1* | 5/2013 | Papasakellariou | H04L 1/0045 370/329 |
| 2013/0114529 | A1* | 5/2013 | Chen | H04L 1/1812 370/329 |
| 2013/0194931 | A1* | 8/2013 | Lee | H04L 5/0053 370/241 |
| 2013/0242904 | A1* | 9/2013 | Sartori | H04L 5/0053 370/329 |
| 2013/0294368 | A1* | 11/2013 | Bendlin | H04W 72/042 370/329 |
| 2014/0003375 | A1* | 1/2014 | Nam | H04W 72/0406 370/329 |
| 2014/0328302 | A1* | 11/2014 | Park | H04L 5/0037 370/329 |

FOREIGN PATENT DOCUMENTS

| | | |
|---|---|---|
| CN | 102164416 A | 8/2011 |
| CN | 102202324 A | 9/2011 |
| CN | 102215586 A | 10/2011 |
| CN | 102244885 | 11/2011 |
| CN | 102368871 | 3/2012 |
| EP | 2 779 501 A1 | 9/2014 |
| EP | 2 843 986 A1 | 3/2015 |
| KR | 20090050132 | 5/2009 |
| WO | WO-2010/068069 | 6/2010 |
| WO | WO 2012/011241 | 1/2012 |

OTHER PUBLICATIONS

Written Opinion of the International Searching Authority for PCT/CN2013/078805 mailed Oct. 17, 2013.
Extended European Search Report for EP 13816593.1 dated Jun. 30, 2015.
Samsung: "Localized Operation and Search Space Design of eCCHs" 3GPP Draft; R1-122254 LEPDCCH Operation, 3rd Generation Partnership Project (3GPP), Mobile Competence Centre; 650, Route Des Lucioles; F-06921 Sophia-Antipolis Cedex; France, vol. RAN WG1, No. Prague, Czech Republic; 20120521-20120525, May 15, 2012, XP050601116.
ZTE Corporation: "Mapping Design for enhanced PDCCH", 3GPP Draft; R1-121055 Mapping Design for EPDCCH, 3rd Generation Partnership Project (3GPP), Mobile Competence Centre; 650, Route Des Lucioles; F-06921 Sophia-Antipolis Cedex; France, vol. RAN WG1, No. Jeju, Korea; 20120326-20120330, Mar. 20, 2012, XP050599358.
ZTE: "Discussion on ePDCCH candidates design", 3GPP Draft; R1-122106 Discussion on EPDCCH Candidates design, 3rd Generation Partnership Project (3GPP), Mobile Competence Centre; 650, Route Des Lucioles; F-06921 Sophia-Antipolis Cedex; France, vol. Ran WG1, No. Prague, Czech Republic; 20120521-20120525, May 15, 2012, XP050601116.
Office Action for Japanese Patent Application No. 2015-520807 mailed Jan. 5, 2015 (including English summary).

* cited by examiner

Mapping of resources of a PRB pair in a normal sub-frame

■ RE resource occupied for PDCCH
▨ RE resource occupied for CRS
▨ RE resource occupied for DMRS
□ RE resource for transmission of E-PDCCH
▤ RE resource occupied for CSI-RS
▨ RE resource occupied for zero-power CSI-RS

BLIND DETECTION MODE DETERMINATION METHOD, BLIND DETECTION METHOD AND DEVICE

CROSS-REFERENCES TO RELATED APPLICATIONS

This application is a US National Stage of International Application No. PCT/CN2013/078805, filed Jul. 4, 2013, designating the United States, and claiming priority to Chinese Patent Application No. 201210242378.3 filed with the State Intellectual Property Office of People's Republic of China on Jul. 12, 2012 and entitled "Method of determining blind detection mode and method of and apparatus for blind detection", the content of which is hereby incorporated by reference in its entirety.

FIELD

The present invention relates to the field of communications and particularly to a method of determining a blind detection mode and a method of and apparatus for blind detection.

BACKGROUND

In a Long Term Evolution (LTE) Release 8/9/10 (Rel-8/9/10) system, Physical Downlink Control Channels (PDCCHs) are transmitted in first N Orthogonal Frequency Division Multiplexing (OFDM) symbols of each radio sub-frame. N may take the values of 1, 2, 3 and 4, and N=4 is only allowed to occur in a system with the system bandwidth of 1.4 MHz. The first N OFDM symbols of the radio frame are also referred to a "legacy PDCCH region".

In the LTE Rel-8/9/10 system, the legacy PDCCH region is logically divided into Control Channel Elements (CCEs). A CCE is composed of nine Resource Element Groups (REGs). The CCE is mapped to the REGs by being mapped to the entire bandwidth range while the REGs are interleaved. An REG is composed of four Resource Elements (REs) duplicated in the time domain and adjacent in the frequency domain. There is no common reference symbol transmitted in any of the REs of which the REG is composed.

Downlink Control Information (DCI) is transmitted in a unit of CCE. A piece of DCI for a User Equipment (UE) (also referred to a terminal) can be transmitted in M logically consecutive CCEs. M in the LTE system may take the value of 1, 2, 4 or 8 and also can be referred to as a CCE aggregation level. The UE performs blind PDCCH detection in the legacy PDCCH region to search for a PDCCH transmitted thereto. The so-called blind detection refers to that a decoding attempt is made for different DCI formats and CCE aggregation levels using a Radio Network Temporary Identity (RNTI) of the UE, and if decoding is correct, then DCI for the UE is received. The UE performs blind detection in the legacy PDCCH region of each downlink sub-frame in a Discontinuous Reception (DRX) state to search for a PDCCH.

In order to improve the performance of a Long Term Evolution-Advanced (LTE-A) system and extend the capacity of PDCCHs, an Enhanced Physical Downlink Control Channel (E-PDCCH) has been introduced to the Rel-11. E-PDCCHs are transmitted in the existing region of Physical Downlink Shared Channels (PDSCHs).

In a LTE Time Division Duplex (TDD) system, a 10 ms radio frame includes ten sub-frames with the length of 1 ms. Transmission directions of some of the sub-frames can be configured, particularly as depicted in Table 1, where D represents a downlink sub-frame, U represents an uplink sub-frame, and S represents a special sub-frame. The downlink sub-frame and the uplink sub-frame are also referred to as normal sub-frames. A special sub-frame has a length of 1 ms and is composed of three time slots which are a Downlink Pilot Time Slot (DwPTS), a Guard Period (GP) and an Uplink Pilot Time Slot (UpPTS), and the lengths of these three time slots can be configured. Special sub-frame configurations supported in the LTE Rel-11 are as depicted in Table 2. Transmission of E-PDCCHs also needs to be supported in the downlink component DwPTS in the special sub-frame. As depicted in Table 2, taking a normal Cyclic Prefix (normal CP) as an example, the DwPTS can include OFDM symbols, the number of which may be one of {3, 6, 9, 10, 11, 12}, whereas the normal downlink sub-frame includes 14 OFDM symbols. As a result, the number of REs really available in each Physical Resource Block (PRB) pair in the DwPTS may be greatly lowered as compared with the normal sub-frame.

TABLE 1

Uplink-downlink configurations in LTE TDD

| Uplink-downlink configuration | Downlink to uplink switching periodicity | Sub-frame No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Number of OFDM symbols in DwPTS/UpPTS in respective special sub-frame configurations

| Special sub-frame configuration | Downlink normal cyclic prefix | | | Downlink extended cyclic prefix | | |
|---|---|---|---|---|---|---|
| | | UpPTS | | | UpPTS | |
| | DwPTS | Uplink normal cyclic prefix | Uplink extended cyclic prefix | DwPTS | Uplink normal cyclic prefix | Uplink extended cyclic prefix |
| 0 | 3 | 1 | 1 | 3 | 1 | 1 |
| 1 | 9 | | | 8 | | |
| 2 | 10 | | | 9 | | |
| 3 | 11 | | | 10 | | |
| 4 | 12 | | | 3 | 2 | 2 |
| 5 | 3 | 2 | 2 | 8 | | |
| 6 | 9 | | | 9 | | |
| 7 | 10 | | | 5 | | |
| 8 | 11 | | | — | — | — |
| 9 | 6 | | | | | |

For different scenarios, transmission modes of E-PDCCHs can be categorized into localized transmission and distributed transmission in the frequency domain. Typically the localized transmission mode is generally applicable to such a scenario that an evolved Node B (eNB) can obtain precise channel information fed back by a UE and interference from an adjacent cell will not dramatically vary from one sub-frame to another, and in this scenario, according to Channel State Information (CSI) fed back by the UE, the eNB selects consecutive frequency resources with a good quality to transmit E-PDCCHs for the UE and performs a pre-coding/beam-forming process to improve the performance of transmission. If no channel information can be obtained accurately or interference from an adjacent cell dramatically varies from one sub-frame to another and may be unpredictable, then E-PDCCHs need to be transmitted in the distributed transmission mode, that is, they may be transmitted over frequency resources inconsecutive in frequency in order for a gain of frequency diversity. Taking DCI transmitted in an E-PDCCH as an example, the E-PDCCH is transmitted in the localized transmission mode as illustrated in FIG. 1A and in the distributed transmission mode as illustrated in FIG. 1B, where DCI of an E-PDCCH is transmitted over resources in four PRB pairs in both of the transmission modes. In the localized transmission mode, DCI of an E-PDCCH is transmitted in a PRB pair #n, a PRB pair #n+1, a PRB pair #n+2 and a PRB pair #n+3, all of which are consecutive in frequency. In the distributed transmission mode, DCI of an E-PDCCH is transmitted in a PRB pair#A, a PRB pair#B, a PRB pair#C and a PRB pair#D inconsecutive in frequency.

As per ongoing discussion about the design of an E-PDCCH, possible designs of an E-PDCCH are as follows.

Firstly, REs in a PRB pair can be divided into a specific number of Enhanced-Control Channel Elements (E-CCEs), where the same number of REs are included in each E-CCE. DCI can be transmitted to the UE by being carried over a physical resource in a unit of E-CCE. This design is generally applicable to the localized transmission mode.

Without any limitation, each E-CCE can be further divided into a specific number of Enhanced-Resource Element Groups (E-REGs).

Secondly, RE resources in a PRB pair can be divided into a specific number of E-REGs, where the same number of REs are included in each E-REG. Furthermore every K E-REGs can be aggregated into an E-CCE. DCI can be transmitted to the UE by being carried over a physical resource in a unit of E-CCE. This design is generally applicable to the distributed transmission mode.

The number M' of E-CCEs to carry a piece of DCI of a UE may take the value of 1, 2, 4, 8, 16 or 32 and can be referred to an E-CCE aggregation level.

The REs in the PRB pair above include really available REs for transmission of E-PDCCHs and also possibly a variety of reference signals, e.g., a Common Resource Signal (CRS), a Demodulation Reference Signal (DMRS), a Cell-Specific Reference Signal (CSI-RS), zero-power CSI-RS, possibly a GP in a special sub-frame in the TDD system, etc.

Accordingly with a PRB pair divided into a specific number of E-CCEs/E-REGs as described above, the numbers of REs really available in the respective E-CCE for transmission of E-PDCCHs may significantly differ, even possibly by a factor of two, from one system configuration to another or from one sub-frame to another due to different reference signals configured in the system.

In the current state of art, the UE always performs with its blind detection capability blind detection at the E-CCE aggregation levels of 1, 2, 4 and 8. However an E-PDCCH may not be transmitted at a low E-CCE aggregation level, so it will be inadvisable for the UE to perform blind detection at such a low E-CCE aggregation level, which would otherwise result in an unnecessary energy overhead of the UE in the course of blind E-PDCCH detection.

BRIEF SUMMARY

An object of the invention is to provide a method of determining a blind detection mode and a method of and apparatus for blind detection so as to address the problem of an unnecessary energy overhead of a UE in blind E-PDCCH detection.

A method of determining a blind detection mode includes:
an eNB determining a blind E-PDCCH detection mode of a UE in a sub-frame according to system configuration information, and a blind detection capability of the UE; and
the eNB notifying the UE of the determined blind E-PDCCH detection mode of the UE in the sub-frame.

A method of blind detection includes:
a UE determining a blind E-PDCCH detection mode in a sub-frame, wherein the blind E-PDCCH detection mode is determined according to system configuration information, and a blind detection capability of the UE; and
the UE performing blind E-PDCCH detection in the sub-frame in the determined blind E-PDCCH detection mode.

An eNB includes:
a blind detection mode determining module configured to determine a blind E-PDCCH detection mode of a UE in a sub-frame according to system configuration information, and a blind detection capability of the UE; and
a blind detection mode notifying module configured to notify the UE of the determined blind E-PDCCH detection mode of the UE in the sub-frame.

A UE includes:
a blind detection mode determining module configured to determine a blind E-PDCCH detection mode in a sub-frame, wherein the blind E-PDCCH detection mode is determined according to system configuration information, and a blind detection capability of the UE; and
a blind detection performing module configured to perform blind E-PDCCH detection in the sub-frame in the determined blind E-PDCCH detection mode.

With the methods and apparatuses according to the embodiments of the invention, a blind E-PDCCH detection mode of a UE in a sub-frame is determined according to resources occupied in the sub-frame for system configuration information so that the UE performs blind E-PDCCH detection in the sub-frame in the determined blind E-PDCCH detection mode, thus avoiding an unnecessary energy overhead.

DETAILED DESCRIPTION OF THE EMBODIMENTS

Respective embodiments of the invention are based upon the following E-PDCCH designs: firstly, REs in a PRB pair can be divided into a specific number of E-CCEs, where the same number of REs are included in each E-CCE. DCI can be transmitted to the UE by being carried over a physical resource in a unit of E-CCE. This design is generally applicable to the localized transmission mode.

Without any limitation, each E-CCE can be further divided into a specific number of E-REGs.

Secondly, RE resources in a PRB pair can be divided into a specific number of E-REGs, where the same number of REs are included in each E-REG Furthermore every K E-REGs can be aggregated into an E-CCE. DCI can be transmitted to the UE by being carried over a physical resource in a unit of E-CCE. This design is generally applicable to the distributed transmission mode.

Based upon the E-PDCCH designs above, in embodiments of the invention, a blind E-PDCCH detection mode of a UE in a sub-frame is determined according to system configuration information, and a blind detection capability of the UE, so that the UE performs blind E-PDCCH detection in the sub-frame in the determined blind E-PDCCH detection mode. An appropriate blind detection mode can be selected according to resources occupied in a sub-frame for system configuration information to thereby avoid an unnecessary energy overhead of the UE in blind E-PDCCH detection.

The methods and apparatuses according to the embodiments of the invention will be described below in details with reference to the drawings.

Figure 1A:
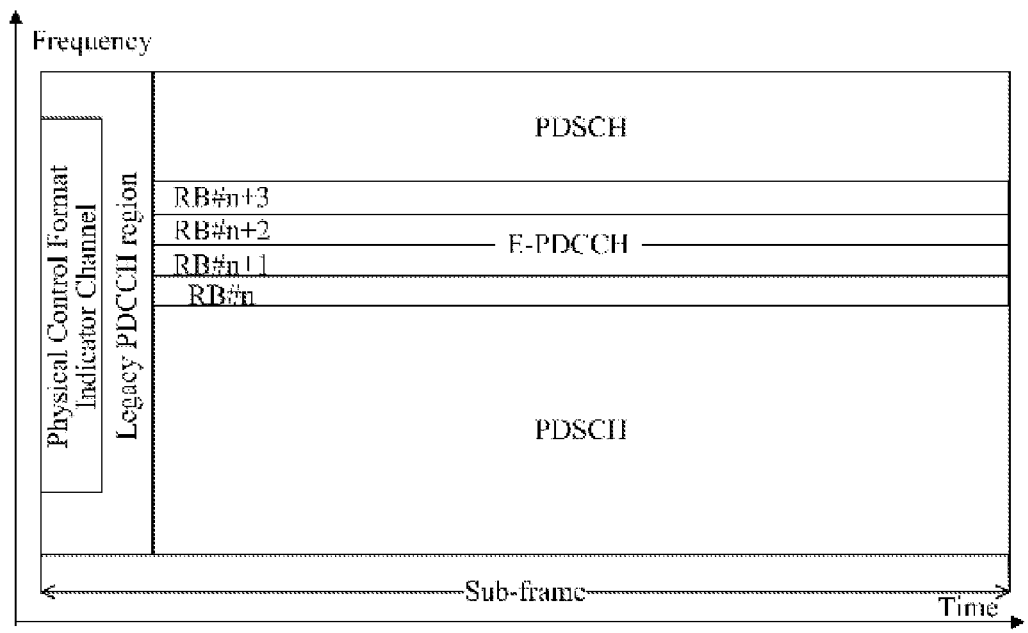
FIG. 1A is a schematic diagram of frequency resources for localized transmission of an E-PDCCH in the frequency domain.
Figure 1B:
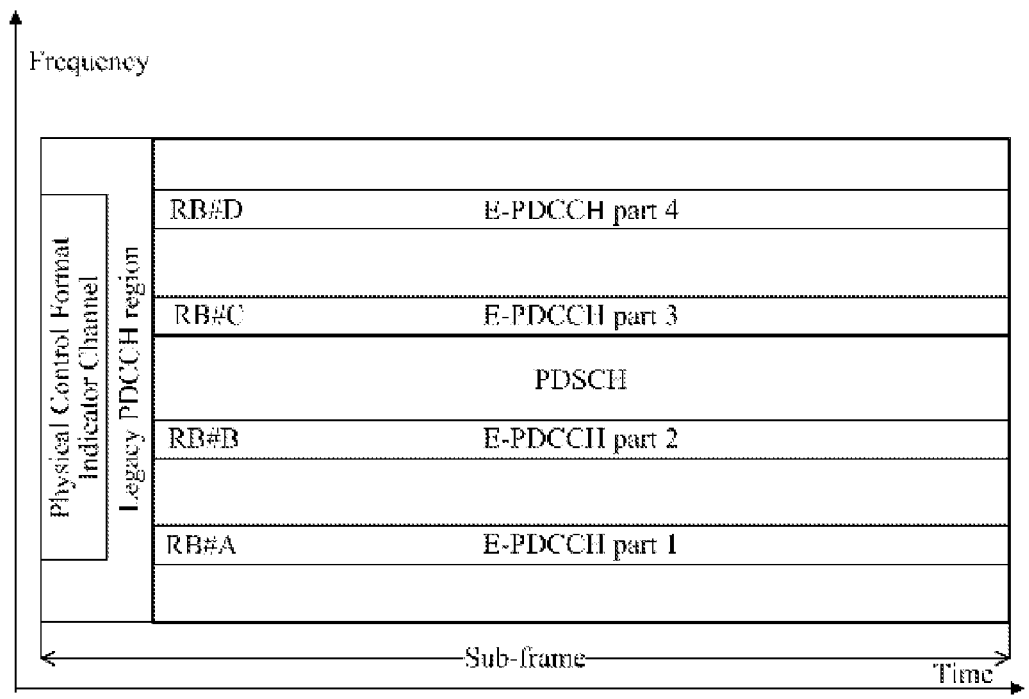
FIG. 1B is a schematic diagram of frequency resources for distributed transmission of an E-PDCCH in the frequency domain.
Figure 2:
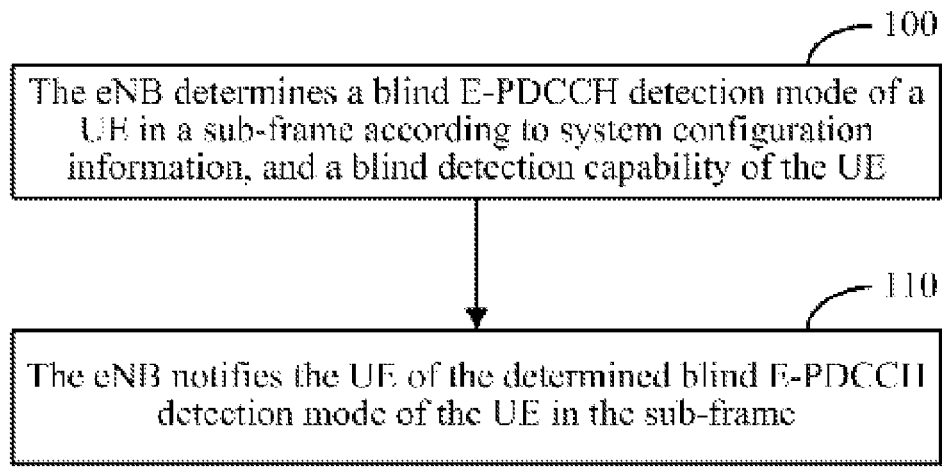
FIG. 2 is a flow chart of a method of determining a blind detection mode according to an embodiment of the invention.

In an embodiment of the invention, a method of determining a blind detection mode by an eNB is as illustrated in FIG. 2, where the method particularly includes the following operations.

In the operation 100, the eNB determines a blind E-PDCCH detection mode of a UE in a sub-frame according to system configuration information, and a blind detection capability of the UE.

In the operation 110, the eNB notifies the UE of the determined blind E-PDCCH detection mode of the UE in the sub-frame.

Particularly the UE can be notified of the determined blind E-PDCCH detection mode of the UE in the sub-frame via existing or extended signaling.

In an embodiment of the invention, the system configuration information can include but will not be limited to the following information.

The number of antenna ports of the eNB, CRS configuration information (e.g., CRS port configuration information, etc.), Demodulation Reference Signal (DMRS) configuration information (e.g., DMRS port configuration information, etc.), CSI-RS configuration information (e.g., CSI-RS ports, locations in the time domain, locations in the frequency domain and other configuration information), zero-power CSI-RS configuration information (e.g., zero-power CSI-RS ports, locations in the time domain, locations in the frequency domain and other configuration information), Positioning Reference Signal (PRS) configuration information (e.g., PRS ports, locations in the time domain, locations in the frequency domain and other configuration information), truncated CRS configuration information in a new type of carrier (e.g., ports, locations in the time domain, locations in the frequency domain and other configuration information thereof), etc.

The system configuration information may further include other overhead channel configuration information in the system, e.g., a Primary Synchronization Signal (PSS), a Secondary Synchronization Signal (SSS), a Physical Broadcast Channel (PBCH), etc.

The system configuration information may further include the number of symbols occupied in a TDD special sub-frame for a DwPTS and other information.

Preferably the operation 100 above can be performed particularly as follows: a set of E-CCE aggregation levels at which the UE needs to perform blind E-PDCCH detection in the sub-frame is determined according to the system configuration information, and the blind detection capability of the UE; and the number of times, that blind detection is performed, corresponding to each E-CCE aggregation level in the set of E-CCE aggregation levels is determined.

The set of E-CCE aggregation levels can be a subset or all of the set {1, 2, 4, 8, 16, 32} or can take other possible values. The number of aggregation levels in the set of E-CCE aggregation levels can be predetermined according to the blind detection capability of the UE.

The set of E-CCE aggregation levels at which the UE needs to perform blind E-PDCCH detection in the sub-frame can be determined according to the system configuration information, and the blind detection capability of the UE, in any one of a number of ways, which can depend upon a real transmission condition of the system.

For example, no E-PDCCH can be transmitted over resources occupied by the system configuration information. If there are such a small number of REs in an E-CCE that can be really used for transmission of E-PDCCHs (as compared with 36 REs occupied in the legacy PDCCH region for a CCE), then it will not be necessary for the UE to perform blind detection at a low E-CCE aggregation level. In view of this, the low E-CCE aggregation level can be precluded from the set of E-CCE aggregation levels to thereby avoid an unnecessary energy overhead of the UE in blind E-PDCCH detection. The number of REs occupied in the legacy PDCCH region for a CCE refers to the number of REs occupied for a CCE in the PDCCH region defined in the protocol of the LTE system. How to determine the set of E-CCE aggregation levels will be described below by way of an example.

The eNB determines the set of E-CCE aggregation levels, at which the UE needs to perform blind E-PDCCH detection in the sub-frame, according to results of comparing the numbers of REs which can be provided at the respective E-CCE aggregation levels for transmission of E-PDCCHs with a preset threshold of the number of REs, and the blind detection capability of the UE, particularly as follows.

The number X of REs which can be provided at an E-CCE aggregation level M' (M' may take the value of 1, 2, 4, 8, 16 or 32) for transmission of E-PDCCHs is determined;

X is compared with the preset threshold of the number of REs; and

The set of E-CCE aggregation levels at which the UE needs to perform blind E-PDCCH detection in the sub-frame is determined according to the results of comparing the numbers of REs which can be provided at the respective E-CCE aggregation levels for transmission of E-PDCCHs with the preset threshold of the number of REs, and the blind detection capability of the UE.

The threshold of the number of REs may be 36 REs occupied in the legacy PDCCH region occupied for a CCE or an approximate number of REs. The threshold of the number of REs can be determined as really needed for the system.

Correspondingly the set of E-CCE aggregation levels at which the UE needs to perform blind E-PDCCH detection in the sub-frame can be determined according to the results of comparing the numbers of REs which can be provided at the respective E-CCE aggregation levels for transmission of E-PDCCHs with the preset threshold of the number of REs, and the blind detection capability of the UE, particularly in any one of the following implementations without any limitation thereto.

In a first implementation, if X is above the threshold of the number of REs (e.g., 36), and the number of E-CCE aggregation levels currently determined to be qualified for addition to the set of E-CCE aggregation levels does not exceed a predetermine number of E-CCE aggregation levels in the set of E-CCE aggregation levels, then the E-CCE aggregation level M' is added to the set of E-CCE aggregation levels; otherwise, it is determined that the UE does not need to perform blind detection at the E-CCE aggregation level M'.

It is judged sequentially in an order of ascending or descending E-CCE aggregation levels whether the respective aggregation levels M' are added to the set of E-CCE aggregation levels, so that the set of E-CCE aggregation levels at which the UE needs to perform blind E-PDCCH detection in the sub-frame is determined as a result.

The number of aggregation levels in the set of E-CCE aggregation level is predetermined as a function of the blind detection capability of the UE.

In a second implementation, if the difference between the threshold of the number of REs (e.g., 36) and X is below a preset first threshold, and the number of E-CCE aggregation levels currently determined to be qualified for addition to the set of E-CCE aggregation levels does not exceed a predetermine number of E-CCE aggregation levels in the set of E-CCE aggregation levels, then the E-CCE aggregation level M' is added to the set of E-CCE aggregation levels; otherwise, it is determined that the UE does not need to perform blind detection at the E-CCE aggregation level M'.

It is judged sequentially in an order of ascending or descending E-CCE aggregation levels whether the respective aggregation levels M' are added to the set of E-CCE aggregation levels, so that the set of E-CCE aggregation levels at which the UE needs to perform blind E-PDCCH detection in the sub-frame is determined as a result.

The number of aggregation levels in the set of E-CCE aggregation level is predetermined as a function of the blind detection capability of the UE.

The value of the first threshold can be determined from a real traffic demand of the system.

In a third implementation, if the ratio between the threshold of the number of REs (e.g., 36) and X is below a preset second threshold, and the number of E-CCE aggregation levels currently determined to be qualified for addition to the set of E-CCE aggregation levels does not exceed a predetermine number of E-CCE aggregation levels in the set of E-CCE aggregation levels, then the E-CCE aggregation level M' is added to the set of E-CCE aggregation levels; otherwise, it is determined that the UE does not need to perform blind detection at the E-CCE aggregation level M'.

It is judged sequentially in an order of ascending or descending E-CCE aggregation levels whether the respective aggregation levels M' are added to the set of E-CCE aggregation levels, so that the set of E-CCE aggregation levels at which the UE needs to perform blind E-PDCCH detection in the sub-frame is determined as a result.

The number of aggregation levels in the set of E-CCE aggregation level is predetermined as a function of the blind detection capability of the UE.

The value of the second threshold can be determined from a real traffic demand of the system.

After the set of E-CCE aggregation levels are determined, the numbers of times, that blind detection is performed, corresponding to the respective E-CCE aggregation levels in the set of aggregation levels can be determined under a predetermined rule which can be configured dependent upon a real demand of the system, and the invention will not be limited in this regard. By way of an example but without any limitation thereto, if the number of aggregation levels in the set of E-CCE aggregation levels is prescribed as four, then a corresponding set of the numbers of times that blind detection is performed can be specified as $\{6, 6, 2, 2\}$.

In the implementations exemplified above in which the set of E-CCE aggregation levels is determined, the number X of REs which can be provided at an E-CCE aggregation level M' for transmission of E-PDCCHs may refer to the numbers of REs, in a number M' of E-CCEs corresponding to an E-CCE aggregation level M', which can be used for transmission of E-PDCCHs. Accordingly the numbers of REs, in these M' E-CCEs, which can be used for transmission of E-PDCCHs can be determined respectively according to resources occupied in the sub-frame for system configuration information.

In the implementations exemplified above in which the set of E-CCE aggregation levels is determined, the number X of REs which can be provided at an E-CCE aggregation level M' for transmission of E-PDCCHs may alternatively refer to the estimated number of REs, in a number M' of E-CCEs corresponding to an E-CCE aggregation level M', which can be used for transmission of E-PDCCHs. Accordingly the number of REs in a PRB pair which can be really used for transmission of E-PDCCHs can be determined according to resources occupied in the sub-frame for the system configuration information, then the average number of REs in an E-CCE which can be really used for transmission of E-PDCCHs can be determined according to the number of E-CCEs into which a PRB pair is divided, and finally the estimated numbers of REs in the M' of E-CCEs which can be used for transmission of E-PDCCHs can be determined according to the average number of REs.

Preferably the eNB can determine a blind E-PDCCH detection mode of the UE in each sub-frame in a predetermined period of time as described in the embodiment above of the invention, where the predetermined period of time can be determined by the eNB side or can be determined by the eNB negotiating with the UE. For example, the predetermined period of time can be a radio frame.

In an embodiment of the invention, the eNB can notify the UE of the determined blind E-PDCCH detection mode of the UE in the sub-frame in a number of ways, and the invention will not be limited in this regard. Preferably the eNB notifies the UE of the blind E-PDCCH detection mode of the UE in each sub-frame in the predetermined period of time. Stated otherwise, the eNB signals information about the blind detection mode of the UE in the predetermined period of time to the UE. The information about the blind detection mode includes information from which a set of E-CCE aggregation levels of each sub-frame in the predetermined period of time and information about corresponding numbers of times that blind detection is performed can be determined.

For a sub-frame, the UE can be notified of a blind E-PDCCH detection mode of the UE in the sub-frame in the following implementations without any limitation thereto.

The UE can be notified of the set of E-CCE aggregation levels in the following implementations without any limitation thereto.

In a first implementation, the eNB signals to the UE each E-CCE aggregation level at which the UE needs to perform blind E-PDCCH detection in the sub-frame.

For example, if the eNB determines the set of E-CCE aggregation levels at which the UE needs to perform blind detection in the sub-frame as {2, 4, 8, 16}, then the eNB notifies the UE the E-CCE aggregation levels 2, 4, 8, 16 at which the UE needs to perform blind detection in the sub-frame.

In a second implementation, the eNB signals to the UE of the lowest E-CCE aggregation level at which the UE needs to perform blind detection in the sub-frame.

The UE can determine the set of E-CCE aggregation levels according to the lowest E-CCE aggregation level under a predetermined rule which can be agreed on between the UE and the eNB side or of which the UE can be notified in advance by the eNB or can be indicated in higher-layer signaling.

For example, if the eNB determines the set of E-CCE aggregation levels at which the UE needs to perform blind detection in the sub-frame as {2, 4, 8, 16}, then the eNB notifies the UE of the lowest E-CCE aggregation level 2 at which the UE needs to perform blind detection in the sub-frame.

If the predetermined rule specifies that the number of aggregation levels in the set of E-CCE aggregation levels is four, then the UE side can determine the set of E-CCE aggregation levels at which the UE needs to perform blind detection as {2, 4, 8, 16} according to the lowest E-CCE aggregation level 2 and the number four of aggregation levels in the set of E-CCE aggregation levels.

In a third implementation, the eNB signals to the UE of the lowest E-CCE aggregation level at which the UE needs to perform blind detection in the sub-frame and the number of aggregation levels in the set of E-CCE aggregation levels.

The UE can determine the set of E-CCE aggregation levels according to the lowest E-CCE aggregation level and the number of aggregation levels in the set of E-CCE aggregation levels.

For example, if the eNB determines the set of E-CCE aggregation levels at which the UE needs to perform blind detection in the sub-frame as {2, 4, 8, 16}, then the eNB notifies the UE of the lowest E-CCE aggregation level 2 at which the UE needs to perform blind detection in the sub-frame and the number four of aggregation levels in the set of E-CCE aggregation levels, then the UE side can determine the set of E-CCE aggregation levels at which the UE needs to perform blind detection in the sub-frame as {2, 4, 8, 16} according to the lowest E-CCE aggregation level 2 and the number four of aggregation levels in the set of E-CCE aggregation levels.

In a fourth implementation, the eNB signals to the UE of the highest E-CCE aggregation level at which the UE needs to perform blind detection in the sub-frame.

The UE can determine the set of E-CCE aggregation levels according to the highest E-CCE aggregation level under a predetermined rule which can be agreed on between the UE and the eNB side or of which the UE can be notified in advance by the eNB or can be indicated in higher-layer signaling.

For example, if the eNB determines the set of E-CCE aggregation levels at which the UE needs to perform blind detection in the sub-frame as {2, 4, 8, 16}, then the eNB notifies the UE of the highest E-CCE aggregation level 16 at which the UE needs to perform blind detection in the sub-frame.

If the predetermined rule specifies that the number of aggregation levels in the set of E-CCE aggregation levels is four, then the UE side can determine the set of E-CCE aggregation levels at which the UE needs to perform blind detection as {2, 4, 8, 16} according to the highest E-CCE aggregation level 16 and the number four of aggregation levels in the set of E-CCE aggregation levels.

In a fifth implementation, the eNB signals to the UE of the highest E-CCE aggregation level at which the UE needs to perform blind detection in the sub-frame and the number of aggregation levels in the set of E-CCE aggregation levels.

The UE can determine the set of E-CCE aggregation levels according to the highest E-CCE aggregation level and the number of aggregation levels in the set of E-CCE aggregation levels.

For example, if the eNB determines the set of E-CCE aggregation levels at which the UE needs to perform blind detection in the sub-frame as {2, 4, 8, 16}, then the eNB notifies the UE of the highest E-CCE aggregation level 16 at which the UE needs to perform blind detection in the sub-frame and the number four of aggregation levels in the set of E-CCE aggregation levels, then the UE side can determine the set of E-CCE aggregation levels at which the UE needs to perform blind detection as {2, 4, 8, 16} according to the highest E-CCE aggregation level 16 and the number four of aggregation levels in the set of E-CCE aggregation levels.

The UE can be notified of the number of times, that blind detection is performed, corresponding to each aggregation level in the set of E-CCE aggregation levels by notifying the UE of all the numbers of times, that blind detection is performed, corresponding to the respective aggregation levels in the set of E-CCE aggregation levels without any limitation thereto.

Since the UE may perform the same mode of blind E-PDCCH detection in a plurality of sub-frames in the predetermined period of time, preferably the eNB can group the sub-frames in the predetermined period of time, and the UE can perform the same mode of blind E-PDCCH detection in each group of sub-frames.

Correspondingly the information about the blind detection mode can further include information about the groups, and information about a set of E-CCE aggregation levels, and information about the numbers of times that blind detection is performed, corresponding to each group, where the UE can be notified of the information about the set of E-CCE aggregation levels, and the information about the numbers of times that blind detection is performed, corresponding to each group in any one of the implementations above.

The eNB may not notify the UE of the information about the groups, and then the UE can know grouping of the sub-frames in the predetermined period of time by agreeing on it with the eNB side or by being notified in advance of it by the eNB side or from higher-layer signaling indicating it. For example, it can be prescribed that normal sub-frames and DwPTSs are grouped separately.

Figure 3:
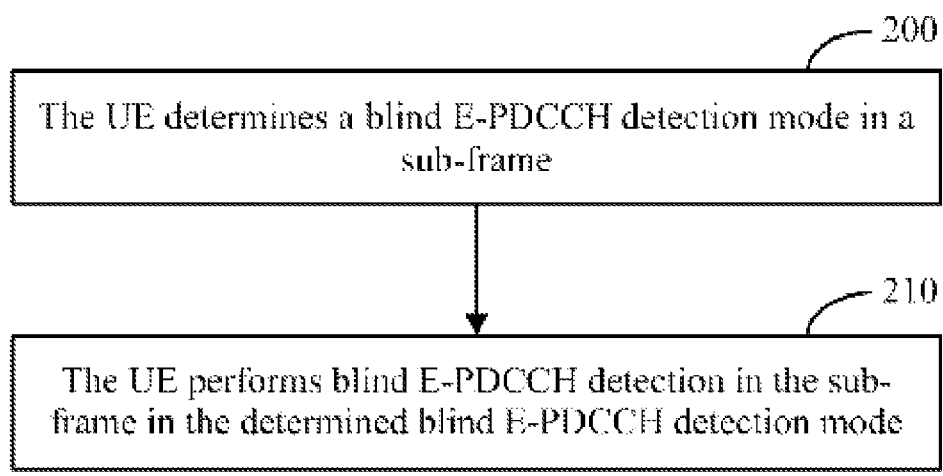
FIG. 3 is a flow chart of a method of blind detection according to an embodiment of the invention.

In an embodiment of the invention, a method of blind detection by a UE is as illustrated in FIG. 3, where the method particularly includes the following operations.

In the operation 200, the UE determines a blind E-PDCCH detection mode in a sub-frame.

The blind E-PDCCH detection mode is determined according to system configuration information, and a blind detection capability of the UE.

In the operation 210, the UE performs blind E-PDCCH detection in the sub-frame in the determined blind E-PDCCH detection mode.

Reference can be made to the method at the eNB side above for a description of the system configuration information, so a repeated description thereof will be omitted here.

Preferably the operation 200 above can be performed particularly as follows: the UE determines the blind E-PDCCH detection mode in the sub-frame according to the system configuration information and the blind detection capability. Particularly the UE determines a set of E-CCE aggregation levels, at which the UE needs to perform blind E-PDCCH detection in the sub-frame, according to the system configuration information and the blind detection capability.

Reference can be made to the description of the eNB side for a particular implementation thereof, so a repeated description thereof will be omitted here.

Preferably the UE can determine the set of E-CCE aggregation levels, at which the UE needs to perform blind E-PDCCH detection in the sub-frame, according to the system configuration information and the blind detection capability particularly as follows: the UE determines the set of E-CCE aggregation levels, at which the UE needs to perform blind E-PDCCH detection in the sub-frame, according to results of comparing the numbers of REs which can be provided at the respective E-CCE aggregation levels for transmission of E-PDCCHs with a preset threshold of the number of REs, and the blind detection capability of the UE, particularly as follows.

The UE determines the number of REs in a PRB pair, which can be used for transmission of E-PDCCHs, according to resources occupied in the sub-frame for the system configuration information;

The UE determines the average number of REs in an E-CCE which can be used for transmission of E-PDCCHs according to the number of E-CCEs into which a PRB pair is divided;

The UE determines the number X of REs, which can be provided at an E-CCE aggregation level M' for transmission of E-PDCCHs, according to the average number of REs;

The UE compares X with the preset threshold of the number of REs; and

The UE determines the set of E-CCE aggregation levels, at which the UE needs to perform blind E-PDCCH detection in the sub-frame, according to the results of comparing the numbers of REs which can be provided at the respective E-CCE aggregation levels for transmission of E-PDCCHs with the preset threshold of the number of REs, and the blind detection capability of the UE.

The preset threshold of the number of REs is the number of REs occupied in the legacy PDCCH region for a CCE.

Preferably the operation 200 above can alternatively be performed as follows: the UE determines the blind E-PDCCH detection mode in the sub-frame according to a notification from an eNB. Particularly the UE can determine a blind E-PDCCH detection mode in each sub-frame in a predetermined period of time according to the notification from the eNB.

Reference can be made to the description of the eNB side for a particular implementation thereof, so a repeated description thereof will be omitted here.

Preferably the UE can determine the blind E-PDCCH detection mode in each sub-frame in the predetermined period of time according to the notification from the eNB as follows.

The UE groups the sub-frames in the predetermined period of time into a group of normal sub-framers and another group of Downlink Pilot Time Slots (DwPTSs) under a predetermined rule; and The UE determines a blind E-PDCCH detection mode in each group of sub-frames according to the notification from the eNB.

The methods according to the embodiments of the invention will be further described below in details in particular application scenarios by way of examples. With a normal CP, it is assumed that there are two CRS ports (for which 16 REs in a PRB pair are occupied) and four DMRS ports (for which 24 REs in a PRB pair are occupied) in a system.

In a first scenario, a PRB pair is divided into four E-CCEs.

Figure 4:
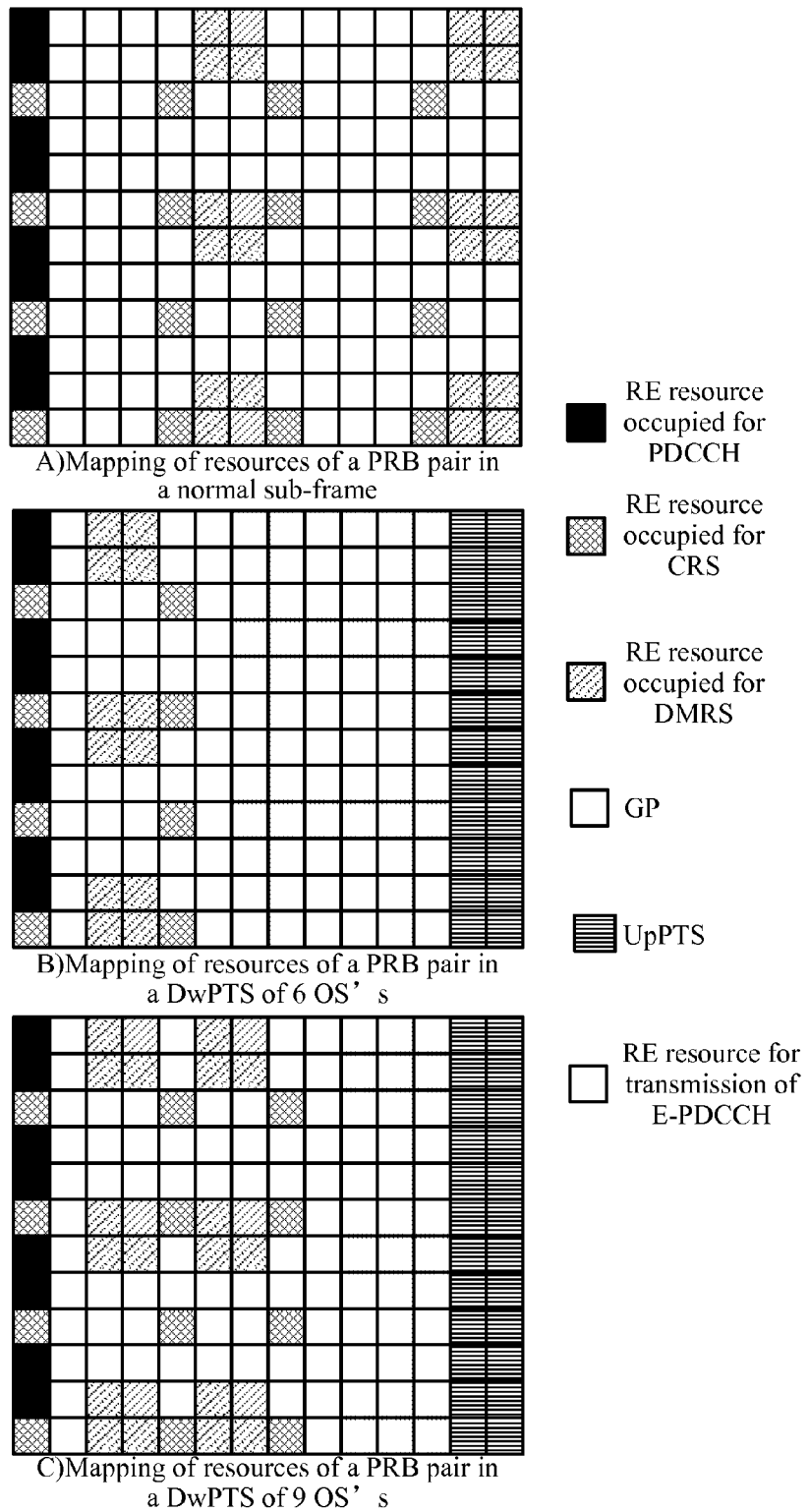
FIG. 4 is a schematic diagram of mapping RE resources in a system configuration according to an embodiment of the invention.

With a normal sub-frame, if one OFDM symbol is occupied in the legacy PDCCH region, and no CSI-RS/zero-power CSI-RS port is configured in the sub-frame, then the number of REs available in a PRB pair is 168−(16+24+8)=120, and the average number of REs in each E-CCE which can be really used for transmission of E-PDCCHs is 120/4=30, as illustrated in FIG. 4A.

If the length of a DwPTS is 6 OS, the number of REs available in a PRB pair is 12×6−(12+4+12)=44, and the average number of REs in each E-CCE which can be really used for transmission of E-PDCCHs is 11, as illustrated in FIG. 4B. In this case, a piece of DCI substantially can not be carried in an E-CCE, that is, it will be not necessary for the UE to perform blind detection of an E-PDCCH at the E-CCE aggregation level 1, which would otherwise increase power consumption of the UE. Moreover there are only 88 valid REs occupied for E-PDCCHs at the E-CCE aggregation level 8 in this design so that the performance of transmission thereof will be inferior to the performance at the aggregation level 4 in the legacy PDCCH region, thus limiting coverage of E-PDCCHs.

If the length of a DwPTS is 9 OS, the number of REs available in a PRB pair is 12×9−(12+24+8)=64, and the average number of REs in each E-CCE which can be really used for transmission of E-PDCCHs is 16, as illustrated in FIG. 4C. In this case, a piece of DCI substantially can not be carried in an E-CCE, that is, it will be not necessary for the UE to perform blind detection of an E-PDCCH at the E-CCE aggregation level 1, which would otherwise increase power consumption of the UE. Moreover there are only 128 valid REs occupied for E-PDCCHs at the E-CCE aggregation level 8 in this design so that the performance of transmission thereof will be inferior to the performance at the aggregation level 4 in the legacy PDCCH region, thus limiting coverage of E-PDCCHs.

If it is specified that the first threshold is 8 and the number of E-CCE aggregation levels in the set of E-CCE aggregation levels is 4, then the eNB or the UE determines a blind E-PDCCH detection mode in a sub-frame as follows.

With a normal sub-frame, the number of REs which can be provided at the E-CCE aggregation level 1 for transmission of E-PDCCHs is determined as 30. Since the difference between 36 and 30 is below the first threshold 8, then the UE can perform blind detection at the E-CCE aggregation level 1 in the normal sub-frame.

Next, according to the number four of E-CCE aggregation levels in the set of E-CCE aggregation levels, it is determined that the set of E-CCE aggregation levels is {1, 2, 4, 8} and the corresponding numbers of times that blind detection is performed are {6, 6, 2, 2}.

With a DwPTS, the length of which is 6 OFDM Symbols (OS), the number of REs which can be provided at the E-CCE aggregation level 1 for transmission of E-PDCCHs is determined as 11. Since the difference between 36 and 11 is above the first threshold 8, then it is determined that the UE can give up blind detection at the E-CCE aggregation level 1. The number of REs which can be provided at the E-CCE aggregation level 2 for transmission of E-PDCCHs is determined as 22. Since the difference between 36 and 22 is above the first threshold 8, then it is determined that the UE can give up blind detection at the E-CCE aggregation level 2. The number of REs which can be provided at the E-CCE aggregation level 4 for transmission of E-PDCCHs is determined as 44. Since the difference between 36 and 44 is below the first threshold 8, then it is determined that the UE can perform blind detection at the E-CCE aggregation level 4 in the DwPTS with the length of 6 OS.

Next according to the number four of E-CCE aggregation levels in the set of E-CCE aggregation levels, the set of E-CCE aggregation levels is determined as {4, 8, 16, 32} and the corresponding numbers of times that blind detection is performed are determined as {6, 6, 2, 2}.

With a DwPTS, the length of which is 9 OS, the number of REs which can be provided at the E-CCE aggregation level 1 for transmission of E-PDCCHs is determined as 16. Since the difference between 36 and 16 is above the first threshold 8, then it is determined that the UE can give up blind detection at the E-CCE aggregation level 1. The number of REs which can be provided at the E-CCE aggregation level 2 for transmission of E-PDCCHs is determined as 32. Since the difference between 36 and 32 is below the first threshold 8, then it is determined that the UE can perform blind detection at the E-CCE aggregation level 2 in the DwPTS with the length of 9 OS.

Next according to the number four of E-CCE aggregation levels in the set of E-CCE aggregation levels, the set of E-CCE aggregation levels is determined as {2, 4, 8, 16} and the corresponding numbers of times that blind detection is performed are determined as {6, 6, 2, 2}.

With the method according to the embodiment of the invention, the UE can perform blind detection in the DwPTS starting with a high aggregation level to thereby lower unnecessary overhead power consumption and also improve the performance of transmission. For example, the performance of transmitting E-PDCCHs at the E-CCE aggregation level 8 will be inferior to the performance at the aggregation level 4 in the legacy PDCCH region. With the method according to the invention, the UE can perform blind detection in the DwPTS at the E-CCE aggregation level 16 and even the E-CCE aggregation level 32 to thereby improve the performance of transmission in the system.

In a second scenario, since it is specified in the standard that no configuration of a CSI-RS/zero-power CSI-RS is allowed for a DwPTS, only a normal sub-frame will be considered in this scenario.

A PRB pair is divided into four E-CCEs.

Figure 5:
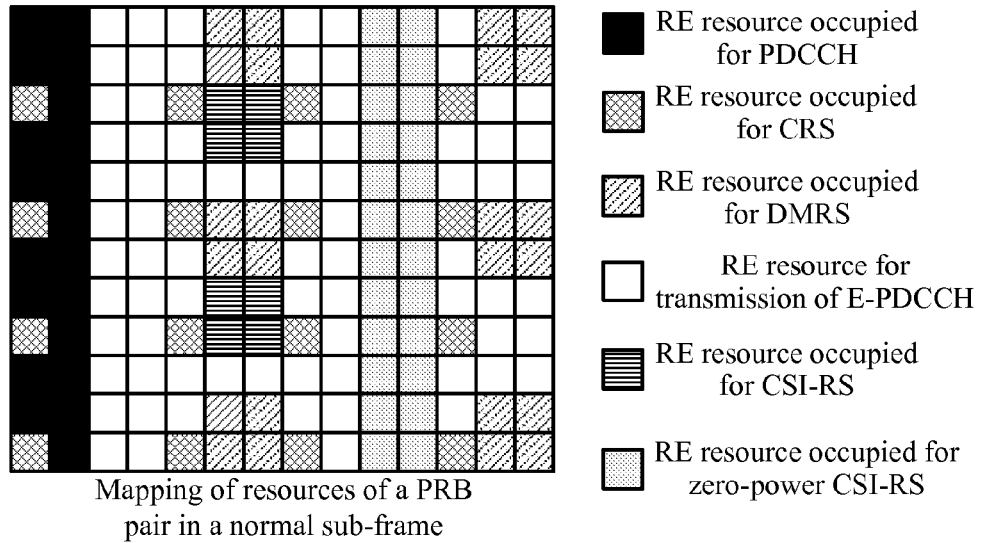
FIG. 5 is a schematic diagram of mapping RE resources in another system configuration according to an embodiment of the invention.

With a normal sub-frame, if two OFDM symbols, a 8-port CSI-RS (8 REs) and all the possible zero-power CSI-RS ports (24 REs) are occupied in the legacy PDCCH region configured in the system, then the number of REs available in a PRB pair is 168−(16+24+20)−(8+24)=76, and the average number of REs in each E-CCE which can be really used for transmission of E-PDCCHs is 76/4=19, as illustrated in FIG. 5. In this case, a piece of DCI substantially can not be carried in an E-CCE, that is, it will be not necessary for the UE to perform blind detection of an E-PDCCH at the E-CCE aggregation level 1, which would otherwise increase power consumption of the UE. Moreover there are only 152 valid REs occupied for E-PDCCHs at the E-CCE aggregation level 8 in this design so that the performance of transmission thereof will be inferior to the performance at the aggregation level 4 in the legacy PDCCH region, thus limiting coverage of E-PDCCHs.

If it is specified that the first threshold is 8 and the number of E-CCE aggregation levels in the set of E-CCE aggregation levels is 4, then the eNB or the UE determines a blind E-PDCCH detection mode in a sub-frame as follows.

The number of REs which can be provided at the E-CCE aggregation level 1 for transmission of E-PDCCHs is determined as 19. Since the difference between 19 and 30 is above the first threshold 8, then the UE can give up blind detection at the E-CCE aggregation level 1. The number of REs which can be provided at the E-CCE aggregation level 2 for transmission of E-PDCCHs is determined as 38. Since the difference between 38 and 30 is not exceed the first threshold 8, then the UE can perform blind detection at the E-CCE aggregation level 2 in the normal sub-frame.

Next according to the number four of E-CCE aggregation levels in the set of E-CCE aggregation levels, the set of E-CCE aggregation levels is determined as {2, 4, 8, 16} and the corresponding numbers of times that blind detection is performed are determined as {6, 6, 2, 2}.

With the method according to the embodiment of the invention, the UE can perform blind detection in the normal sub-frame starting with a high aggregation level to thereby lower unnecessary overhead power consumption and also improve the performance of transmission. For example, the performance of transmitting E-PDCCHs at the E-CCE aggregation level 8 will be inferior to the performance at the aggregation level 4 in the legacy PDCCH region. With the method according to the invention, the UE can perform blind detection in the normal sub-frame at the E-CCE aggregation level 16 and even the E-CCE aggregation level 32 to thereby improve the performance of transmission in the system.

Figure 6A:
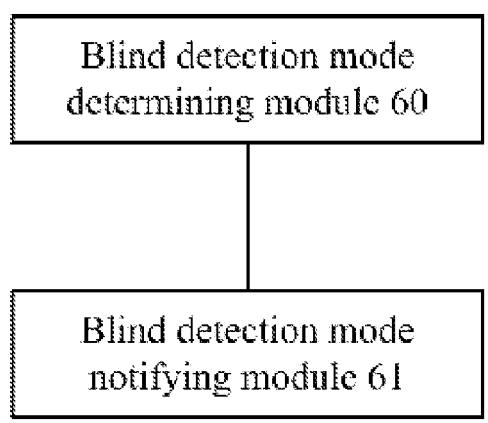
FIG. 6A is a schematic functional structural diagram of an eNB according to an embodiment of the invention.

An embodiment of the invention further provides an eNB, and FIG. 6 illustrates a structure thereof particularly embodied as follows.

A blind detection mode determining module 60 is configured to determine a blind E-PDCCH detection mode of a UE in a sub-frame according to system configuration information, and a blind detection capability of the UE; and A blind detection mode notifying module 61 is configured to notify the UE of the determined blind E-PDCCH detection mode of the UE in the sub-frame.

Preferably the blind detection mode determining module 60 includes:

a set of aggregation levels for blind detection determining sub-module configured to determine a set of E-CCE aggregation levels, at which the UE needs to perform blind E-PDCCH detection in the sub-frame, according to the system configuration information, and the blind detection capability of the UE; and a number of times for blind detection determining sub-module configured to determine the number of times, that blind detection is performed, corresponding to each E-CCE aggregation level in the set of E-CCE aggregation levels.

Preferably the set of aggregation levels for blind detection determining sub-module is particularly configured:

to determine the set of E-CCE aggregation levels, at which the UE needs to perform blind E-PDCCH detection in the sub-frame, according to results of comparing the numbers of REs which can be provided at the respective E-CCE aggregation levels for transmission of E-PDCCHs with a preset threshold of the number of REs, and the blind detection capability of the UE.

Preferably the set of aggregation levels for blind detection determining sub-module is configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the preset threshold of the number of REs; and to determine the set of E-CCE aggregation levels, at which the UE needs to perform blind E-PDCCH detection in the sub-frame, according to the results of comparing the numbers of REs which can be provided at the respective E-CCE aggregation levels for transmission of E-PDCCHs with the preset threshold of the number of REs, and the blind detection capability of the UE.

The preset threshold of the number of REs is the number of REs occupied in the legacy PDCCH region for a CCE.

Preferably the set of aggregation levels for blind detection determining sub-module is configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the number 36 of REs occupied in the legacy PDCCH region for a CCE; and if the ratio of 36 to X is below a preset second threshold and the number of currently determined E-CCE aggregation levels does not exceed the blind detection capability of the UE, to add the E-CCE aggregation level M' to the set of E-CCE aggregation levels.

Preferably the blind detection mode notifying module 61 is configured:

to notify the UE of a blind E-PDCCH detection mode in each sub-frame in a predetermined period of time.

Preferably the blind detection mode notifying module 61 is configured:

to group the sub-frames in the predetermined period of time under a predetermined rule, where the UE performs the same mode of blind E-PDCCH detection in each group of sub-frames; and to notify the UE of the blind E-PDCCH detection mode in each group of sub-frames.

Preferably the blind detection mode notifying module 61 configured to group the sub-frames in the predetermined period of time under the predetermined rule is particularly configured:

to group the sub-frames in the predetermined period of time into a group of normal sub-framers and another group of Downlink Pilot Time Slots (DwPTSs) under the predetermined rule.

Figure 6B:
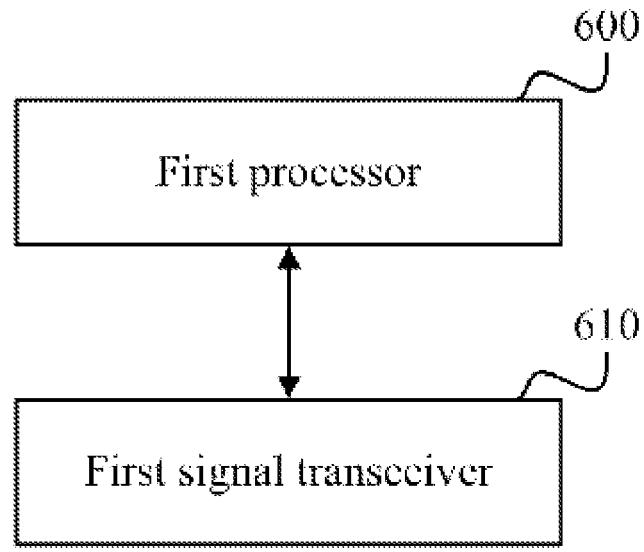
FIG. 6B is a schematic physical structural diagram of an eNB according to an embodiment of the invention.

In an implementation in hardware, the blind detection mode determining module 60 can particularly be a processor, and the blind detection mode notifying module 61 can particularly be a signal transceiver including transmit and receive antennas, and in this implementation, as illustrated in FIG. 6B, an eNB according to an embodiment of the invention includes:

a first processor 600 configured to determine a blind E-PDCCH detection mode of a UE in a sub-frame according to system configuration information, and a blind detection capability of the UE; and a first signal transceiver 610 configured to notify the UE of the determined blind E-PDCCH detection mode of the UE in the sub-frame.

Preferably the first processor 600 is particularly configured: to determine a set of E-CCE aggregation levels, at which the UE needs to perform blind E-PDCCH detection in the sub-frame, according to the system configuration information, and the blind detection capability of the UE; and to determine the number of times, that blind detection is performed, corresponding to each E-CCE aggregation level in the set of E-CCE aggregation levels.

Preferably the first processor 600 is particularly configured:

to determine the set of E-CCE aggregation levels, at which the UE needs to perform blind E-PDCCH detection in the sub-frame, according to results of comparing the numbers of REs which can be provided at the respective E-CCE aggregation levels for transmission of E-PDCCHs with a preset threshold of the number of REs, and the blind detection capability of the UE.

Preferably the first processor 600 is particularly configured: to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the preset threshold of the number of REs; and to determine the set of E-CCE aggregation levels, at which the UE needs to perform blind E-PDCCH detection in the sub-frame, according to the results of comparing the numbers of REs which can be provided at the respective E-CCE aggregation levels for transmission of E-PDCCHs with the preset threshold of the number of REs, and the blind detection capability of the UE.

The preset threshold of the number of REs is the number of REs occupied in the legacy PDCCH region for a CCE.

Preferably the first processor 600 is particularly configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the number 36 of REs occupied in the legacy PDCCH region for a CCE; and if the ratio of 36 to X is below a preset second threshold and the number of currently determined E-CCE aggregation levels does not exceed the blind detection capability of the UE, to add the E-CCE aggregation level M' to the set of E-CCE aggregation levels.

Preferably the first signal transceiver 610 is particularly configured:

to notify the UE of a blind E-PDCCH detection mode in each sub-frame in a predetermined period of time.

Preferably the first signal transceiver 610 is particularly configured:

to group the sub-frames in the predetermined period of time under a predetermined rule, where the UE performs the same mode of blind E-PDCCH detection in each group of sub-frames; and to notify the UE of the blind E-PDCCH detection mode in each group of sub-frames.

Preferably the first signal transceiver 610 configured to group the sub-frames in the predetermined period of time under the predetermined rule is particularly configured:

to group the sub-frames in the predetermined period of time into a group of normal sub-framers and another group of Downlink Pilot Time Slots (DwPTSs) under the predetermined rule.

Figure 7A:
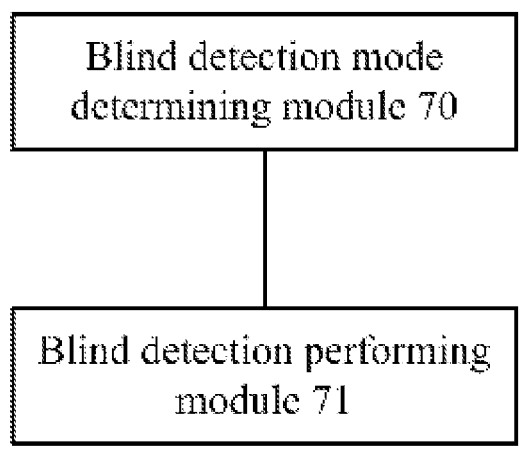
FIG. 7A is a schematic functional structural diagram of a UE according to an embodiment of the invention.

An embodiment of the invention further provides a UE, and FIG. 7A illustrates a structure thereof particularly embodied as follows.

A blind detection mode determining module 70 is configured to determine a blind E-PDCCH detection mode in a sub-frame, where the blind E-PDCCH detection mode is determined according to system configuration information, and a blind detection capability of the UE; and A blind detection performing module 71 is configured to perform blind E-PDCCH detection in the sub-frame in the determined blind E-PDCCH detection mode.

Preferably the blind detection mode determining module 70 is particularly configured:

to determine the blind E-PDCCH detection mode in the sub-frame according to the system configuration information, and the blind detection capability;

or to determine the blind E-PDCCH detection mode in the sub-frame according to a notification from an eNB.

Preferably the blind detection mode determining module 70 configured to determine the blind E-PDCCH detection mode in the sub-frame according to the system configuration information, and the blind detection capability, particularly includes:

a set of aggregation levels for blind detection determining sub-module configured to determine a set of E-CCE aggregation levels, at which the UE needs to perform blind E-PDCCH detection in the sub-frame, according to the system configuration information, and the blind detection capability; and a number of times for blind detection determining sub-module configured to determine the number of times, that blind detection is performed, corresponding to each E-CCE aggregation level in the set of E-CCE aggregation levels.

Preferably the set of aggregation levels for blind detection determining sub-module is particularly configured:

to determine the set of E-CCE aggregation levels, at which the UE needs to perform blind E-PDCCH detection in the sub-frame, according to results of comparing the numbers of REs which can be provided at the respective E-CCE aggregation levels for transmission of E-PDCCHs with a preset threshold of the number of REs, and the blind detection capability of the UE.

Preferably the set of aggregation levels for blind detection determining sub-module is particularly configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the preset threshold of the number of REs; and to determine the set of E-CCE aggregation levels, at which the UE needs to perform blind E-PDCCH detection in the sub-frame, according to the results of comparing the numbers of REs which can be provided at the respective E-CCE aggregation levels for transmission of E-PDCCHs with the preset threshold of the number of REs, and the blind detection capability of the UE.

The preset threshold of the number of REs is the number of REs occupied in the legacy PDCCH region for a CCE.

Preferably the set of aggregation levels for blind detection determining sub-module is particularly configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the number 36 of REs occupied in the legacy PDCCH region for a CCE; and if the ratio of 36 to X is below a preset second threshold and the number of currently determined E-CCE aggregation levels does not exceed the blind detection capability of the UE, to add the E-CCE aggregation level M' to the set of E-CCE aggregation levels.

Preferably the blind detection mode determining module 70 configured to determine the blind E-PDCCH detection mode in the sub-frame according to the notification from the eNB is particularly configured:

to determine a blind E-PDCCH detection mode in each sub-frame in a predetermined period of time according to the notification from the eNB.

Preferably the blind detection mode determining module 70 is particularly configured:

to group the sub-frames in the predetermined period of time into a group of normal sub-framers and another group of Downlink Pilot Time Slots (DwPTSs) under a predetermined rule; and to determine the blind E-PDCCH detection mode in each sub-frame according to the notification from the eNB.

Figure 7B:
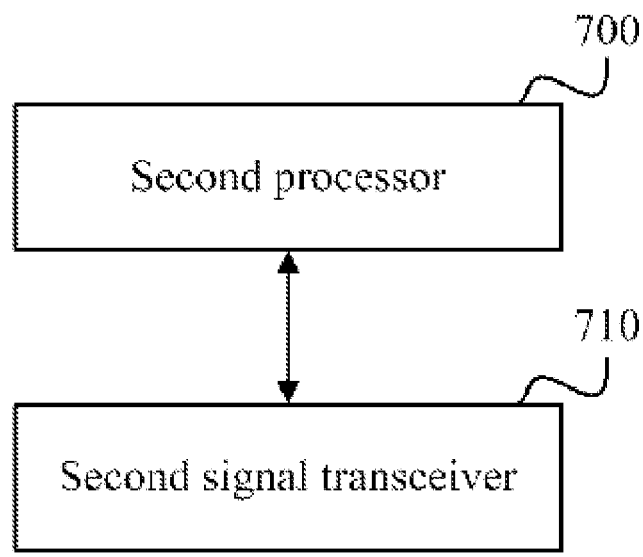
FIG. 7B is a schematic physical structural diagram of a UE according to an embodiment of the invention.

In an implementation in hardware, the blind detection mode determining module 70 can particularly be a processor, and the blind detection performing module 71 can particularly be a signal transceiver including transmit and receive antennas, and in this implementation, as illustrated in FIG. 7B, a UE according to an embodiment of the invention includes:

a second processor 700 configured to determine a blind E-PDCCH detection mode in a sub-frame, where the blind E-PDCCH detection mode is determined according to system configuration information, and a blind detection capability of the UE; and a second signal transceiver 710 configured to perform blind E-PDCCH detection in the sub-frame in the determined blind E-PDCCH detection mode.

Preferably the second processor 700 is particularly configured:

to determine the blind E-PDCCH detection mode in the sub-frame according to the system configuration information, and the blind detection capability;

or to determine the blind E-PDCCH detection mode in the sub-frame according to a notification from an eNB.

Preferably the second processor 700 is particularly configured: to determine a set of E-CCE aggregation levels, at which the UE needs to perform blind E-PDCCH detection in the sub-frame, according to the system configuration information, and the blind detection capability; and to determine the number of times, that blind detection is performed, corresponding to each E-CCE aggregation level in the set of E-CCE aggregation levels.

Preferably the second processor 700 is particularly configured:

to determine the set of E-CCE aggregation levels, at which the UE needs to perform blind E-PDCCH detection in the sub-frame, according to results of comparing the numbers of REs which can be provided at the respective E-CCE aggregation levels for transmission of E-PDCCHs with a preset threshold of the number of REs, and the blind detection capability of the UE.

Preferably the second processor 700 is particularly configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the preset threshold of the number of REs; and to determine the set of E-CCE aggregation levels, at which the UE needs to perform blind E-PDCCH detection in the sub-frame, according to the results of comparing the numbers of REs which can be provided at the respective E-CCE aggregation levels for transmission of E-PDCCHs with the preset threshold of the number of REs, and the blind detection capability of the UE.

The preset threshold of the number of REs is the number of REs occupied in the legacy PDCCH region for a CCE.

Preferably the second processor 700 is particularly configured:

to determine the number of REs in a PRB pair, which can be used for transmission of E-PDCCHs, according to resources occupied in the sub-frame for the system configuration information;

to determine the average number of REs in an E-CCE, which can be used for transmission of E-PDCCHs, according to the number of E-CCEs into which a PRB pair is divided;

to determine the number X of REs, which can be provided at an E-CCE aggregation level M' for transmission of E-PDCCHs, according to the average number of REs;

to compare X with the number 36 of REs occupied in the legacy PDCCH region for a CCE; and if the ratio of 36 to X is below a preset second threshold and the number of currently determined E-CCE aggregation levels does not exceed the blind detection capability of the UE, to add the E-CCE aggregation level M' to the set of E-CCE aggregation levels.

Preferably the second processor 700 configured to determine the blind E-PDCCH detection mode in the sub-frame according to the notification from the eNB is particularly configured to determine a blind E-PDCCH detection mode in each sub-frame in a predetermined period of time according to the notification from the eNB.

Preferably the second processor 700 is particularly configured:

to group the sub-frames in the predetermined period of time into a group of normal sub-framers and another group of Downlink Pilot Time Slots (DwPTSs) under a predetermined rule; and to determine the blind E-PDCCH detection mode in each sub-frame according to the notification from the eNB.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the concept and scope of the invention. Thus the invention is also intended to encompass these modifications and variations thereto so long as the modifications and variations come into the scope of the claims appended to the invention and their equivalents.

What is claimed is:

1. A method of determining a blind detection mode comprising:
   an evolved Node B, eNB, determining a blind Enhanced Physical Downlink Control Channel, E-PDCCH, detection mode of a User Equipment, UE, in a sub-frame according to system configuration information, and a blind detection capability of the UE; and
   the eNB notifying the UE of the determined blind E-PDCCH detection mode of the UE in the sub-frame;
   wherein the eNB determining the blind E-PDCCH detection mode of the UE in the sub-frame according to the system configuration information, and the blind detection capability of the UE comprises:
   the eNB determining a set of Enhanced-Control Channel Element, E-CCE, aggregation levels, at which the UE needs to perform blind E-PDCCH detection in the sub-frame, according to the system configuration information, and the blind detection capability of the UE; and
   the eNB determining a number of times, that blind detection is performed, corresponding to each E-CCE aggregation level in the set of E-CCE aggregation levels.

2. The method of claim 1, wherein the eNB determining the set of E-CCE aggregation levels, at which the UE needs to perform blind E-PDCCH detection in the sub-frame, according to the system configuration information, and the blind detection capability of the UE comprises:
   the eNB determining the set of E-CCE aggregation levels, at which the UE needs to perform blind E-PDCCH detection in the sub-frame, according to results of comparing numbers of Resource Elements, REs, which can be provided at the respective E-CCE aggregation levels for transmission of E-PDCCHs with a preset threshold of a number of REs, and the blind detection capability of the UE.

3. The method of claim 1, wherein the eNB notifying the UE of the determined blind E-PDCCH detection mode of the UE in the sub-frame comprises:
   the eNB notifying the UE of a blind E-PDCCH detection mode in each sub-frame in a predetermined period of time.

4. The method of claim 3, wherein the eNB notifying the UE of a blind E-PDCCH detection mode in each sub-frame in the predetermined period of time comprises:
   the eNB grouping sub-frames in the predetermined period of time under a predetermined rule, wherein the UE performs a same blind E-PDCCH detection mode in each group of sub-frames; and the eNB notifying the UE of the blind E-PDCCH detection mode in each group of sub-frames.

5. The method of claim 4, wherein the eNB grouping the sub-frames in the predetermined period of time under the predetermined rule comprises:
   the eNB grouping the sub-frames in the predetermined period of time into a group of normal sub-framers and another group of Downlink Pilot Time Slots, DwPTSs, under the predetermined rule.

6. A method of blind detection comprising:
   a User Equipment, UE, determining a blind Enhanced Physical Downlink Control Channel, E-PDCCH, detection mode in a sub-frame, wherein the blind E-PDCCH detection mode is determined according to system configuration information, and a blind detection capability of the UE; and
   the UE performing blind E-PDCCH detection in the sub-frame in the determined blind E-PDCCH detection mode;
   wherein the UE determining the blind E-PDCCH detection mode in the sub-frame comprises:
   the UE determining the blind E-PDCCH detection mode in the sub-frame according to the system configuration information, and the blind detection capability;
   or
   the UE determining the blind E-PDCCH detection mode in the sub-frame according to a notification from an evolved Node B, eNB;
   wherein the UE determining the blind E-PDCCH detection mode in the sub-frame according to the system configuration information, and the blind detection capability comprises:
   the UE determining a set of Enhanced-Control Channel Element, E-CCE, aggregation levels, at which the UE needs to perform blind E-PDCCH detection in the sub-frame, according to the system configuration information, and the blind detection capability; and
   the UE determining a number of times, that blind detection is performed, corresponding to each E-CCE aggregation level in the set of E-CCE aggregation levels.

7. The method of claim 6, wherein the UE determining the set of E-CCE aggregation levels, at which the UE needs to perform blind E-PDCCH detection in the sub-frame, according to the system configuration information, and the blind detection capability comprises:
   the UE determining the set of E-CCE aggregation levels, at which the UE needs to perform blind E-PDCCH detection in the sub-frame, according to results of comparing numbers of Resource Elements, REs, which can be provided at the respective E-CCE aggregation levels for transmission of E-PDCCHs with a preset threshold of a number of REs, and the blind detection capability of the UE.

8. The method of claim 6, wherein the UE determining the blind E-PDCCH detection mode in the sub-frame according to the notification from the eNB comprises:
   the UE determining a blind E-PDCCH detection mode in each sub-frame in a predetermined period of time according to the notification from the eNB.

9. The method of claim 8, wherein the UE determining a blind E-PDCCH detection mode in each sub-frame in the predetermined period of time according to the notification from the eNB comprises:
   the UE grouping sub-frames in the predetermined period of time into a group of normal sub-framers and another group of Downlink Pilot Time Slots, DwPTSs under a predetermined rule; and the UE determining a blind E-PDCCH detection mode in each group of sub-frames according to the notification from the eNB.

10. An evolved Node B, eNB, comprising:
a blind detection mode determining module configured to determine a blind Enhanced Physical Downlink Control Channel, E-PDCCH, detection mode of a User Equipment, UE, in a sub-frame according to system configuration information, and a blind detection capability of the UE; and
a blind detection mode notifying module configured to notify the UE of the determined blind E-PDCCH detection mode of the UE in the sub-frame;
wherein the blind detection mode determining module comprises:
a set of aggregation levels for blind detection determining sub-module configured to determine a set of Enhanced-Control Channel Element, E-CCE, aggregation levels, at which the UE needs to perform blind E-PDCCH detection in the sub-frame, according to the system configuration information, and the blind detection capability of the UE; and
a number of times for blind detection determining sub-module configured to determine a number of times, that blind detection is performed, corresponding to each E-CCE aggregation level in the set of E-CCE aggregation levels.

11. The eNB of claim 10, wherein the set of aggregation levels for blind detection determining sub-module is configured:
to determine the set of E-CCE aggregation levels, at which the UE needs to perform blind E-PDCCH detection in the sub-frame, according to results of comparing numbers of Resource Elements, REs, which can be provided at the respective E-CCE aggregation levels for transmission of E-PDCCHs with a preset threshold of a number of REs, and the blind detection capability of the UE.

12. A User Equipment, UE, comprising:
a blind detection mode determining module configured to determine a blind Enhanced Physical Downlink Control Channel, E-PDCCH, detection mode in a sub-frame, wherein the blind E-PDCCH detection mode is determined according to system configuration information, and a blind detection capability of the UE; and
a blind detection performing module configured to perform blind E-PDCCH detection in the sub-frame in the determined blind E-PDCCH detection mode;
wherein the blind detection mode determining module is configured:
to determine the blind E-PDCCH detection mode in the sub-frame according to the system configuration information, and the blind detection capability;
or
to determine the blind E-PDCCH detection mode in the sub-frame according to a notification from an evolved Node B, eNB;
wherein the blind detection mode determining module configured to determine the blind E-PDCCH detection mode in the sub-frame according to the system configuration information, and the blind detection capability, comprises:
a set of aggregation levels for blind detection determining sub-module configured to determine a set of Enhanced-Control Channel Element, E-CCE, aggregation levels, at which the UE needs to perform blind E-PDCCH detection in the sub-frame, according to the system configuration information, and the blind detection capability; and
a number of times for blind detection determining sub-module configured to determine a number of times, that blind detection is performed, corresponding to each E-CCE aggregation level in the set of E-CCE aggregation levels.

13. The UE of claim 12, wherein the set of aggregation levels for blind detection determining sub-module is configured:
to determine the set of E-CCE aggregation levels, at which the UE needs to perform blind E-PDCCH detection in the sub-frame, according to results of comparing numbers of Resource Elements, REs, which can be provided at the respective E-CCE aggregation levels for transmission of E-PDCCHs with a preset threshold of a number of REs, and the blind detection capability of the UE.

14. The UE of claim 12, wherein the blind detection mode determining module configured to determine the blind E-PDCCH detection mode in the sub-frame according to the notification from the eNB is configured:
to determine a blind E-PDCCH detection mode in each sub-frame in a predetermined period of time according to the notification from the eNB.

* * * * *